United States Patent
Benedetti

(10) Patent No.: US 9,821,747 B2
(45) Date of Patent: Nov. 21, 2017

(54) TETHERED FASTENER AND RELATED METHODS

(71) Applicant: Newfrey LLC, Newark, DE (US)

(72) Inventor: Steven Michael Benedetti, Sterling Heights, MI (US)

(73) Assignee: Newfrey LLC, New Britain, CT (US)

( * ) Notice: Subject to any disclaimer, the term of this patent is extended or adjusted under 35 U.S.C. 154(b) by 202 days.

(21) Appl. No.: 14/836,662

(22) Filed: Aug. 26, 2015

(65) Prior Publication Data
US 2016/0101756 A1    Apr. 14, 2016

Related U.S. Application Data

(60) Provisional application No. 62/061,930, filed on Oct. 9, 2014.

(51) Int. Cl.
*B60R 21/216*    (2011.01)
*B60R 13/02*    (2006.01)
(Continued)

(52) U.S. Cl.
CPC ........ *B60R 21/216* (2013.01); *B60R 13/0206* (2013.01); *F16B 5/0657* (2013.01);
(Continued)

(58) Field of Classification Search
CPC . B60R 21/216; B60R 13/0206; F16B 21/086; F16B 21/075; F16B 5/0657; F16B 21/088; F16B 21/065
See application file for complete search history.

(56) References Cited

U.S. PATENT DOCUMENTS 1,270,494 A * 6/1918 Christiansen ......... B60P 7/0823
                                               24/302
3,508,303 A   4/1970 Miyasaka
(Continued)

FOREIGN PATENT DOCUMENTS

EP    0695671 A1    2/1996
EP    0722862 A1    7/1996
(Continued)

OTHER PUBLICATIONS

International Search Report and Written Opinion dated Dec. 4, 2015 in corresponding PCT Application No. PCT/US2015/052840.

*Primary Examiner* — Robert J Sandy
*Assistant Examiner* — Louis Mercado
(74) *Attorney, Agent, or Firm* — Harness, Dickey & Pierce, PLC

(57) ABSTRACT

A plastic body includes first and second connector ends coupled together via an elongate tether. A frangible strap can extend from a first to a second point along the longitudinal length of the tether. The length of the frangible strap can be less than the tether length between the first and second points. A metal clip can be non-releasably coupled to the second connector end by being retained within a cage housing. The connector ends can be releasably coupled to each other by cooperating elongate rails, and with the frangible strap in a non-extended configuration with the first and second connector ends non-releasably coupled associated automobile components. The frangible strap can deform or separate as a result of a tensile force acting on the frangible strap as the tether extends when an airbag deploys separating the automobile components and the connector ends.

23 Claims, 7 Drawing Sheets

(51) Int. Cl.
*F16B 5/06* (2006.01)
*F16B 21/07* (2006.01)
*F16B 21/06* (2006.01)
*F16B 21/08* (2006.01)

(52) U.S. Cl.
CPC .......... *F16B 21/075* (2013.01); *F16B 21/086* (2013.01); *F16B 21/065* (2013.01); *F16B 21/088* (2013.01)

(56) References Cited

U.S. PATENT DOCUMENTS

| | | |
|---|---|---|
| 4,250,599 A | 2/1981 | Nagashima et al. |
| 4,398,317 A | 8/1983 | Schubring |
| 5,038,444 A | 8/1991 | Gordon |
| 5,150,919 A | 9/1992 | Sakakida et al. |
| 5,263,665 A | 11/1993 | Koneczny et al. |
| 5,398,960 A | 3/1995 | Ravenberg et al. |
| 5,403,034 A | 4/1995 | Gans et al. |
| 5,472,228 A | 12/1995 | Bentley et al. |
| 5,533,237 A | 7/1996 | Higgins |
| 5,533,746 A | 7/1996 | Whited |
| 5,647,607 A | 7/1997 | Bolieau |
| 5,651,562 A | 7/1997 | Hagen et al. |
| 5,791,683 A | 8/1998 | Shibata et al. |
| 5,813,693 A | 9/1998 | Gordon et al. |
| 6,053,527 A | 4/2000 | Gans et al. |
| 6,145,870 A | 11/2000 | Devane et al. |
| 6,381,811 B2 | 5/2002 | Smith et al. |
| 6,394,695 B1 | 5/2002 | Chausset |
| 6,402,188 B1 | 6/2002 | Pasch |
| 6,431,585 B1 | 8/2002 | Rickabus et al. |
| RE38,125 E | 5/2003 | Shibata et al. |
| 6,565,116 B1 | 5/2003 | Tajima et al. |
| 6,715,185 B2 | 4/2004 | Angellotti |
| 6,802,527 B2 | 10/2004 | Schmidt et al. |
| 6,851,710 B2 | 2/2005 | Wong et al. |
| 6,889,999 B2 | 5/2005 | Dominissini et al. |
| 6,913,280 B2 | 7/2005 | Dominissini et al. |
| 7,077,449 B2 | 7/2006 | Tokunaga |
| 7,155,783 B2 | 1/2007 | Nessel et al. |
| 7,178,205 B2 | 2/2007 | Nessel et al. |
| 7,178,850 B2 | 2/2007 | Smith et al. |
| 7,290,795 B2 | 11/2007 | Kawai et al. |
| 7,338,068 B2 | 3/2008 | Kawai et al. |
| 7,454,826 B2 | 11/2008 | Nessel et al. |
| 7,698,788 B2 | 4/2010 | Hansen et al. |
| 7,832,064 B2 | 11/2010 | Nessel et al. |
| 7,922,189 B1 | 4/2011 | Dillon et al. |
| 8,046,880 B2 | 11/2011 | Katoh et al. |
| 8,128,145 B2 | 3/2012 | Smith et al. |
| 8,186,709 B2 | 5/2012 | She |
| 8,297,645 B2 | 10/2012 | Thurston et al. |
| 8,316,514 B2 | 11/2012 | Sano |
| 8,480,120 B1 | 7/2013 | Fukuda et al. |
| 8,678,427 B1 | 3/2014 | Spamer et al. |
| 8,844,992 B1 | 9/2014 | Noga et al. |
| 8,876,151 B2 | 11/2014 | Yamamoto |
| 2006/0032029 A1* | 2/2006 | Nessel ................ B60R 13/0206 24/289 |
| 2006/0032030 A1* | 2/2006 | Nessel ................ B60R 13/0206 24/289 |
| 2006/0239772 A1 | 10/2006 | Kuroda |
| 2006/0290155 A1 | 12/2006 | Smith et al. |
| 2008/0235919 A1* | 10/2008 | Giddings ............ B60R 13/0206 24/289 |
| 2013/0168515 A1 | 7/2013 | Yamamoto |
| 2016/0068130 A1* | 3/2016 | Benedetti ............. B60R 21/216 24/293 |
| 2016/0069366 A1* | 3/2016 | Benedetti ................ F16B 5/065 24/297 |

FOREIGN PATENT DOCUMENTS

| | | |
|---|---|---|
| EP | DE19838069 A1 | 3/2000 |
| FR | 2780115 A1 | 6/1998 |
| GB | 2293355 A | 9/1995 |
| WO | WO9967542 A1 | 12/1999 |

\* cited by examiner

TETHERED FASTENER AND RELATED METHODS

CROSS-REFERENCE TO RELATED APPLICATIONS

This application claims the benefit of U.S. Provisional Application No. 62/061,930 filed on Oct. 9, 2014. The entire disclosure of the above application is incorporated herein by reference.

FIELD

The present disclosure relates to fasteners used in a vehicle to join, and control the release of, a vehicle component during deployment of an occupant restraint system such as an airbag.

BACKGROUND

This section provides background information related to the present disclosure which is not necessarily prior art.

Clips and fasteners can be used to retain trim panels and other components (e.g., exterior moldings, mirrors, instrument panels, etc.) relative to a body portion of an automobile or other vehicle. In some instances, a tethered fastener can include a tether that controls the release or disengagement of the trim panel from the body portion. For example, in the event an air bag or other occupant restraint system is deployed, the trim panel can disengage from the body portion. The tethered fastener can help to control the movement of the trim panel (e.g., distance, direction, speed, etc.) relative to the body portion.

SUMMARY

This section provides a general summary of the disclosure, and is not a comprehensive disclosure of its full scope or all of its features.

In accordance with one aspect of the present disclosure, a motor vehicle airbag occupant restraint system tethered fastener can include a first plastic connector end coupled to a second plastic connector end via an elongate plastic tether having a longitudinal length extending completely from and between the first and second connector ends. A frangible strap can extend from a first point along the longitudinal length of the plastic tether to a second point along the longitudinal length of the plastic tether. A metal clip can be non-releasably coupled to the second connector end. The first and second connector ends can be releasably adjacently coupled together with the frangible strap in a non-extended configuration when the first connector end is non-releasably coupled to a first of an associated automobile portion and an associated trim component and the second connector end is non-releasably coupled to a second of the associated automobile portion and associated trim component via the metal clip. The frangible strap can have a longitudinal strap length that is less than the distance between the first and second points along the longitudinal length of the plastic tether, and the frangible strap can deform, separate, or both, as a result of a tensile force acting on the frangible strap as the plastic tether moves from the non-extended configuration to an extended configuration when an associated airbag deploys separating the associated automobile portion and trim component and the first and second connector ends.

In accordance with one aspect of the present disclosure, a motor vehicle airbag occupant restraint system tethered fastener can include a metal clip and a first plastic connector end can have a releasable coupling member. A second plastic connector end can have a cooperating releasable coupling member and a cage housing retaining the metal clip. A elongate plastic tether can extend completely from and between the first and second connector ends to couple the first and second connector ends together. The first and second connector ends can be releasably coupled together via the releasable coupling members when the first connector ends is non-releasably coupled to a first of an associated automobile portion and an associated trim component, and when the metal clip is non-releasably retained within the cage housing and the second connector end is non-releasably coupled to a second of the associated automobile portion and the associated trim component via the metal clip. The metal clip can non-releasably remain within the cage housing and non-releasably coupled to the second of the associated automobile portion and the associated trim component during the deployment of the occupant restraint system when an associated airbag deploys uncoupling the releasable coupling members and separating the associated automobile portion and trim component and the first and second connector ends.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
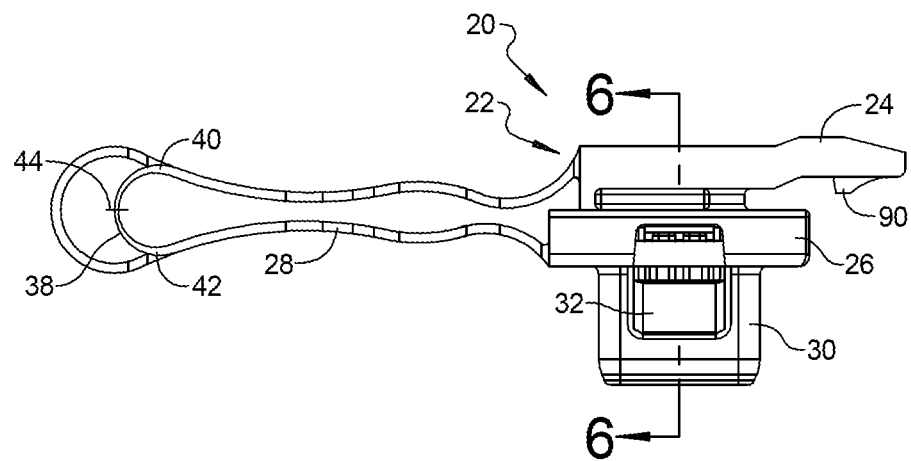
FIG. 1 is a side elevation view of an exemplary embodiment of a tethered fastener in accordance with the present disclosure.
Figure 2:
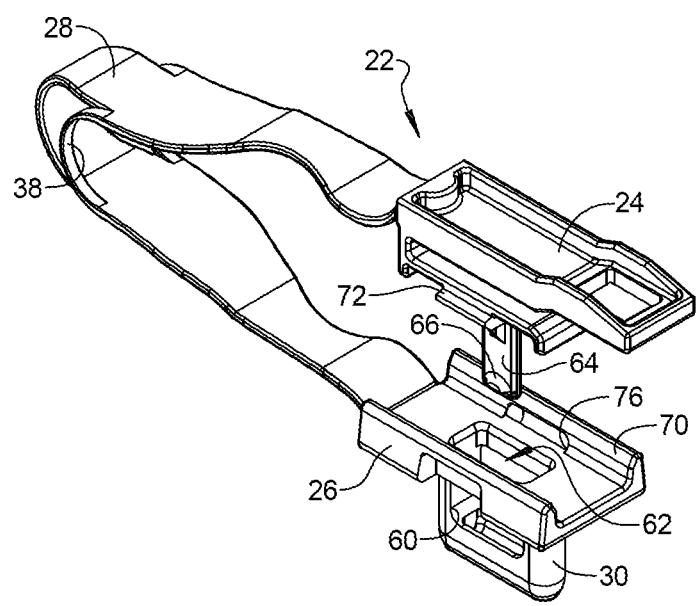
FIG. 2 is a perspective view of the plastic body member of the tethered fastener of FIG. 1.
Figure 3:
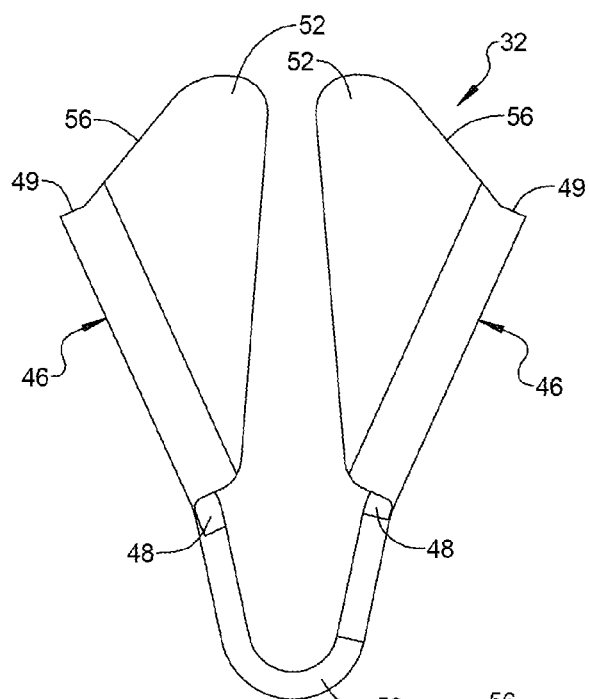
FIG. 3 is an end elevation view of the metal clip of the tethered fastener of FIG. 1.
Figure 4:
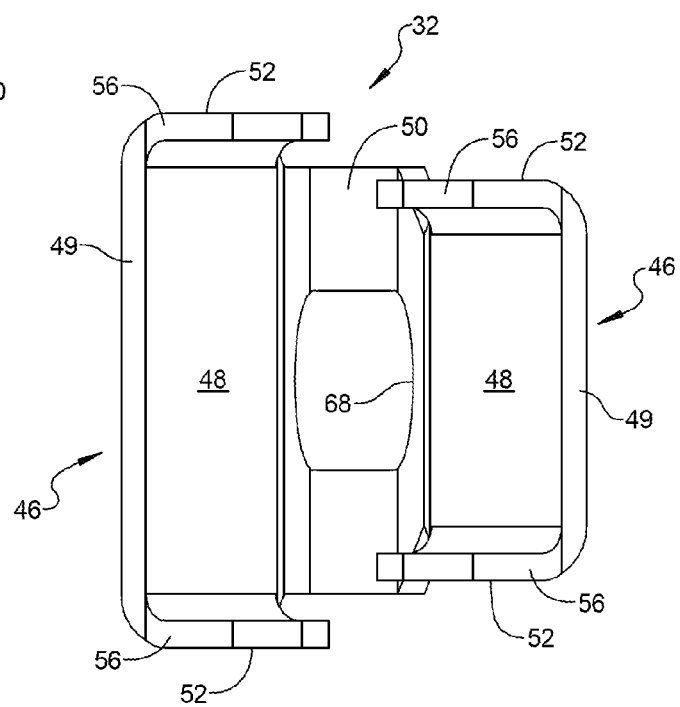
FIG. 4 is a top plan view of the metal clip of the tethered fastener of FIG. 1.
Figure 5:
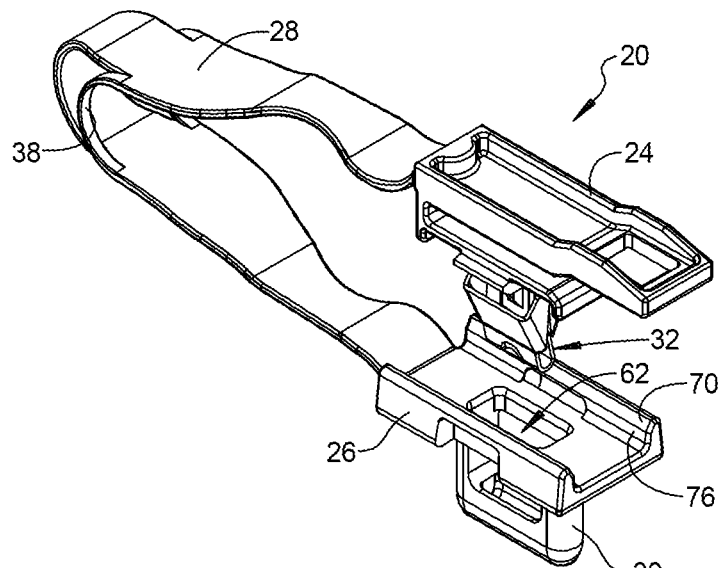
FIG. 5 is a perspective view similar to FIG. 2 of the tethered fastener of FIG. 1 (including both the plastic body member and the metal clip).
Figure 6:
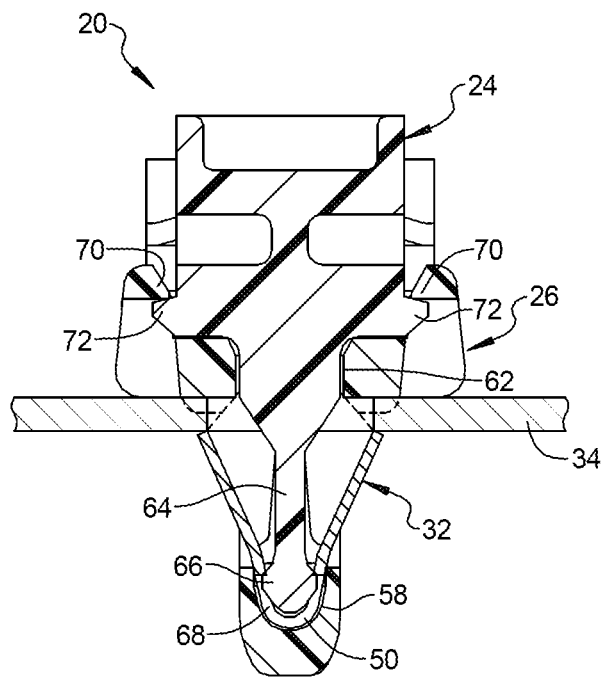
FIG. 6 is a cross-sectional view through line 6-6 of FIG. 1 with the first connector end coupled with the second connector end.
Figure 7:
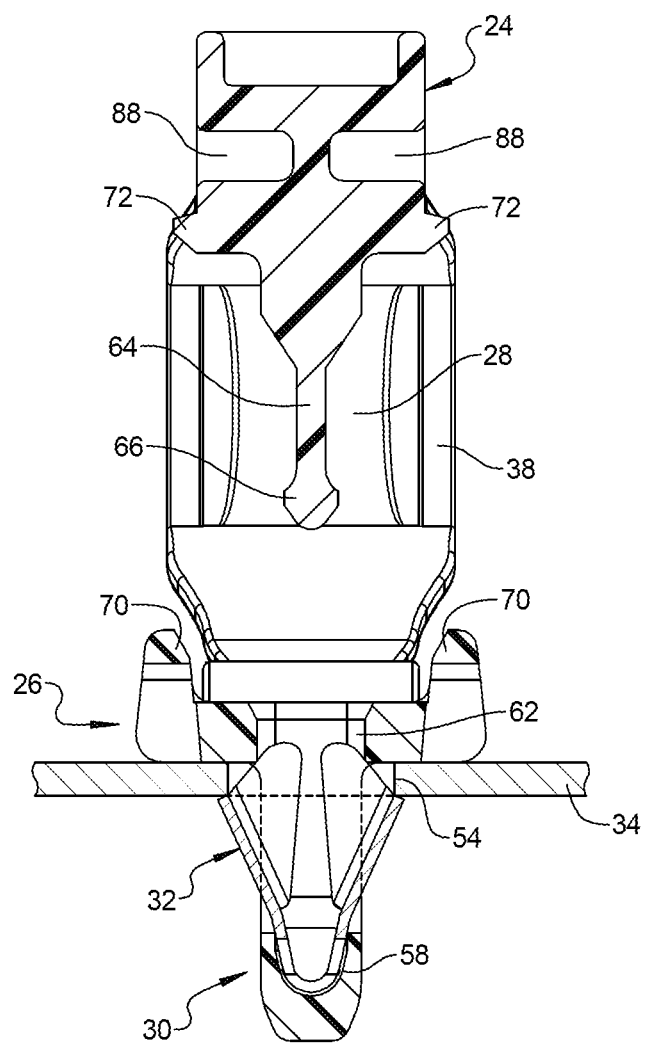
FIG. 7 is a cross-sectional view similar to FIG. 6, but with the first connector end uncoupled from the second connector end.

Example embodiments will now be described more fully with reference to the accompanying drawings.

Referring to FIGS. 1-10, a tethered fastener 20 generally includes a plastic body 22 with first connector end 24 joined to a second connector end 26 via an elongate tether 28 coupled between the first and second connector ends 24 and 26, respectively. The second connector end 26 can include a cage 30 structured to receive and secure a metal clip 32 to the second connector end 26. The metal clip 32 can couple the second connector end 26 to a second component 34 of an automobile, such as a metal body panel. The first connector end 24 can be coupled to a first component 36 of an automobile such as a trim panel. The tethered fastener 20 can help manage the movement of the trim panel 36 as it is releases from the body panel 34 during deployment of the occupant restraint system such as an airbag.

Figure 9:
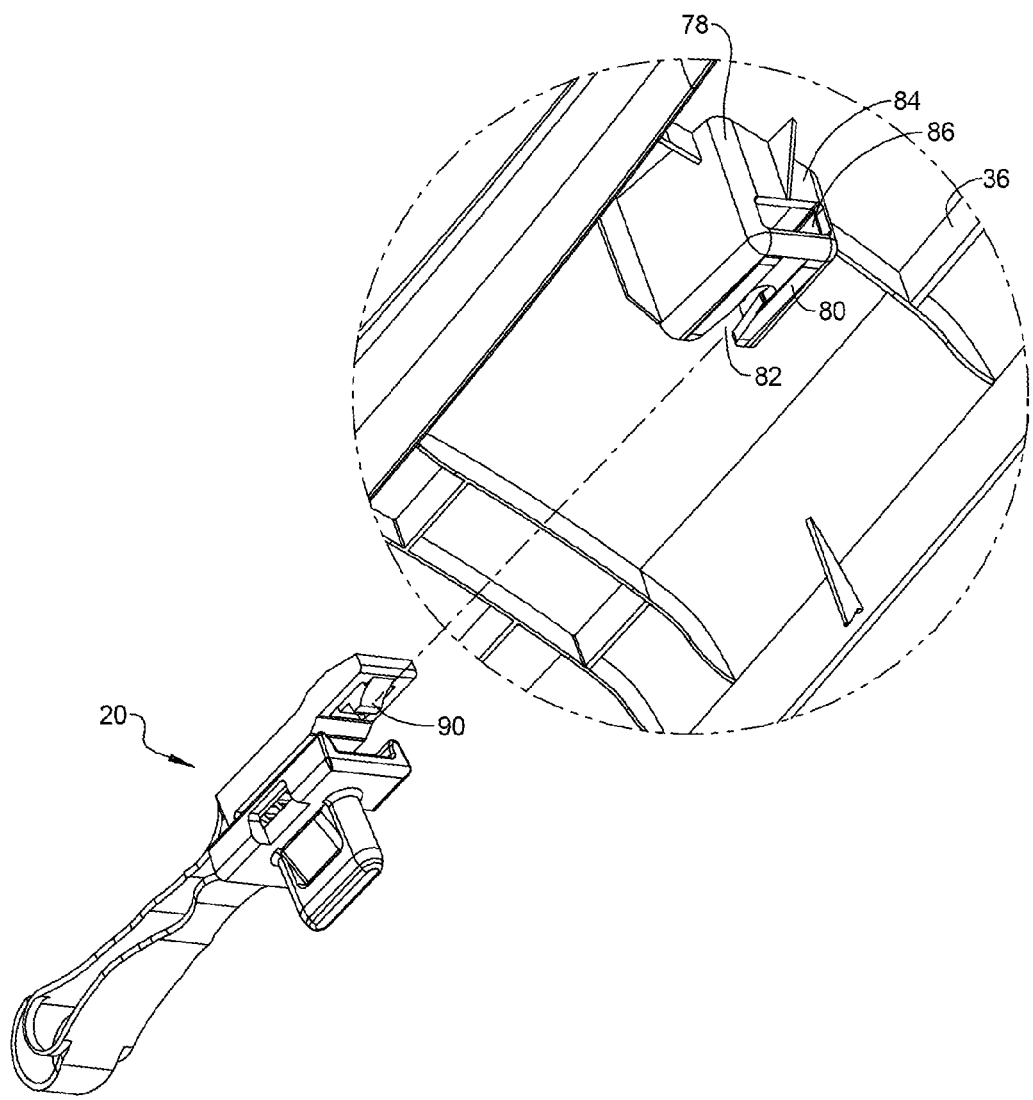
FIG. 9 is a perspective view of the tethered fastener of FIG. 1 including a trim panel portion including a dog house connector to which the first connector can be coupled.
Figure 10:
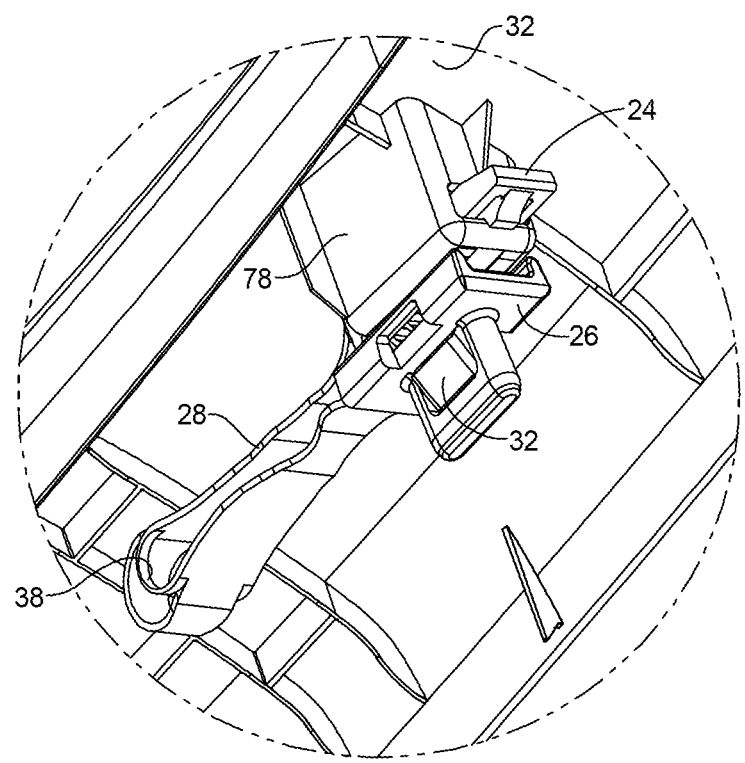
FIG. 10 is a perspective view of the tethered fastener of FIG. 1 coupled to the dog house connector of FIG. 9.

The elongate tether 28 has a folded configuration (shown in FIGS. 1, 9 and 10). In the folded configuration, one or more frangible straps 38 extend from a first point 40 along a longitudinal length of the tether 28 to a second point 42 along the length of the tether 28 that is longitudinally spaced from the first 40. For each frangible strap 38, the distance between the first and second points 40 and 42, respectively, along the longitudinal length of the tether 28 is greater than an overall length of the corresponding frangible strap 38. Each frangible strap 38 can have a gradually thinned cross-sectional area, a discrete notch or other separation initiating or locating structure represented by line 44. Such a gradually thinned or discretely notched area 44 can be positioned at about the midway point along the length of the frangible strap 38. In the folded configuration, the frangible straps 38 can have a generally arch shape.

As the tether 28 moves toward an extended or elongated configuration during airbag deployment, the frangible strap 38 can begin to elongate and can eventually separate as a result of tensile force acting on the frangible strap 38. The frangible straps 38 can absorb energy as a result of such elongation and/or separation of the frangible strap 38. This reduces the amount of energy that the first connector end 24 and the second connector end 26 need to pass to the component 36 and 34, respectively, to which each is coupled.

The frangible strap 38 is able to absorb energy up to the point at which it separates into two parts. In some cases, the frangible straps 38 can be structured or configured to separate at a force that is more than about 500 Newtons. In other cases, the frangible straps 38 can be structured or configured to separate at a force that is more than about 600 Newtons. In some cases, the frangible straps 38 can be structured or configured to separate at a force that is less than about 800 Newtons. In other cases, the frangible straps 38 can be structured or configured to separate at a force that is less than about 700 Newtons.

The configuration of the frangible straps 38 can be varied in many ways. In the drawings, two frangible straps 38 are provided; one along each longitudinal edge of the centrally positioned flat tether portion 28. Alternatively, a single centrally positioned frangible strap 38 can be provided between two flat tether portions 28. Many other variations are possible, including the possibility of rounded, squared, or rectangular cross-sectional shapes of the frangible straps 38 and/or tether portions 28.

As noted above, the second connector end 26 can include a cage 30 structured to receive and secure the metal clip 32 to the second connector end 26. The metal clip 32 can have two wings 46; each including an outer, longitudinally extending, side wall 48 joined together at a generally U-shaped end 50. The side walls 48 can angle outwardly from the U-shaped end 50 in an open U or V-shaped configuration. A distal end 49 of each side wall 48 is provided to engage against the automobile body component 34 at or adjacent an aperture 54 in the body component 34.

Each side or wing wall 48 can include a pair of inwardly transversely extending walls 52, with one of the inwardly transversely extending walls 52 at each end of the side wall 48. The transversely extending walls 52 of each wing 46 can have an upwardly and inwardly angled upper edge 56 extending from an upper distal end or edge 49 of the side wall 48. Each transversely extending wall 52 of each wing 46 is offset from the oppositely disposed transversely extending walls 52 of the other wing 46. As a result, the transversely extending walls 52 are longitudinally offset from each other so that oppositely disposed transversely extending walls 52 do not interfere with each other to limit compression of the wings 46 toward each other. Rather than contacting each other during compression of the wings 46 toward each other, oppositely disposed transversely extending walls 52 can pass alongside each other.

The cage 30 of the second connector end 26 can include a U-shaped recess 58 that receives the U-shaped end 50 of the metal clip 32. The cage 30 can include one or more side openings 60 through which the wings 46 of the metal clip 32 can extend outwardly. The cage 30 can include an upper insertion opening 62 through which the metal clip 32 can be inserted into the cage 30. The upper insertion opening 62 can have a transverse dimension that requires the wings 46 to be compressed toward each other to the point that the oppositely disposed transversely extending walls 52 pass alongside each other.

The first connector end 24 can include an extending member, such as a wall or arm 64. The extending member 64 can engage an inside of the metal clip 32 at or adjacent to its U-shaped end 50. The extending member 64 can include a protrusion 66 to engage a cooperating opening 68 in the metal clip 32 to releasably retain the metal clip 32 on the extending member 64, and therefore, on the first connector end 24. The extending member 64 can be used to push the metal clip 32 through the insertion opening 62 and into the cage 30. The cage 30 is structured or configured to retain the metal clip 32 within the cage 30 even during an airbag deployment with the second connector end 26 inserted into the aperture 54 of the panel 34. The metal clip 32 operates to provide a pull-out force of the second connector end 26 from the panel 34 that in some cases is at least about 800 Newtons, and in some cases is at least about 900 Newtons.

The upper insertion opening 62 can be positioned between longitudinal rail coupling members 70 extending adjacent each lateral side of the second connector end 26. Cooperating longitudinal rail coupling members 72 can extend adjacent each lateral side of the first plastic connector end 24. The longitudinal rail coupling members 70 of the second connector end can be inwardly facing, and can define a longitudinal groove or opening 76. The longitudinal rail coupling members 72 of the first plastic connector end 24 can be outwardly facing, and can define a longitudinal protrusion that can fit within the groove or opening 76.

The longitudinal rail coupling members 70 and 72 need not extend continuously, but can comprise multiple rail segments. The structure of the longitudinal rail members 70 and 72 (e.g., the overall length, the amount of interference between the longitudinal rail members) can be selected to provide separation at a desired separation force. In some cases, the longitudinal rail coupling members 70 and 72 can operate to maintain the first and second connector ends 24 and 26, respectively, coupled together until a separation force of at least about 100 Newtons is experienced. In some cases, the longitudinal rail coupling members 70 and 72 operate to release the first and second connector ends 24 and 26, respectively, when a separation force of at less than about 200 Newtons is experienced.

The configuration or structures of the longitudinal coupling rail members 70 and 72 (e.g., where segments are longitudinally positioned, segment lengths, the amount of interference between the members at different points) can operate to preferentially disengage at desired locations to facilitate initial movement of the first connector end 24 in a desired direction upon separating from the second connector end 26 during airbag deployment.

Related manufacturing methods should be apparent from the discussion above. For example, such methods can include providing a tethered fastener 20 with any combination of the features and configuring the tethered fastener 20 to have any of the characteristics or functionality described above. Such manufacturing methods can include inserting the metal clip 32 through an insertion opening 62 into the cage 30 of the second connector end 26. The inserting can include releasably mounting the metal clip 32 on the extending member 64 of the first connector end 24 and using the first connector end 24 to push the metal clip 32 through the insertion opening 62. The inserting can include compressing the metal clip 32 to an extent that oppositely disposed transversely extending walls 52 of the metal clip 32 pass alongside each other as the metal clip 32 passes through the insertion opening 62. Such methods can include configuring the cage 30 to retain the metal clip 32 during subsequent deployment of the occupant restraint system or airbag.

Such manufacturing methods can include releasably coupling the first connector end 24 to the second connector end 26. The coupling can be configured to disengage and allow separation of the first connector end 24 from the second connector end 26 during subsequent deployment of the occupant restraint system or airbag. The first connector end 24 can be coupled to a dog house member 78 of the automobile trim panel 36. The dog house member 78 can include a wall 80 defining a slot 82 and an adjacent end wall 84 defining an opening 86. The first connector end 24 can fit into the slot 82 and receive portions of the adjacent wall 80 in cooperating slots 88 of the first connector end 24. A distal end of the first connector end 24 can include a locking protrusion 90 that can extend through the opening 86 and engages against the adjacent end wall 84 to couple the first connector end 24 to the dog house member 78 and to the trim panel 36.

The tethered fastener 20 can be shipped in a shipping or folded configuration that can include any combination of the actions described above. Any such combination of actions can occur before shipping the tethered fastener 20. For example, the metal clip 32 can be positioned within the cage 30 of the second connector end 26 and the first connector end 24 can be coupled to the second connector end 26 as illustrated in FIG. 1 prior to shipping. The shipping configuration of the tethered fastener 20 can include coupling the first connector end 24 to the trim panel 32 via a dog house member 78 as illustrated in FIG. 10.

As discussed above, the first connector end 24 can be non-releasably coupled to the trim panel 36 and releasably coupled to the second connector end 26. The trim panel 36 can be releasably coupled to the body panel 34 by non-releasably coupling or retaining the cage 30 of the second connector end 26 within the aperture 54 of the body panel 34 via the metal clip 32. Such a folded or installed configuration is shown in FIG. 10 (without the body panel 34) and in FIG. 6 (without the trim panel 36).

Figure 8:
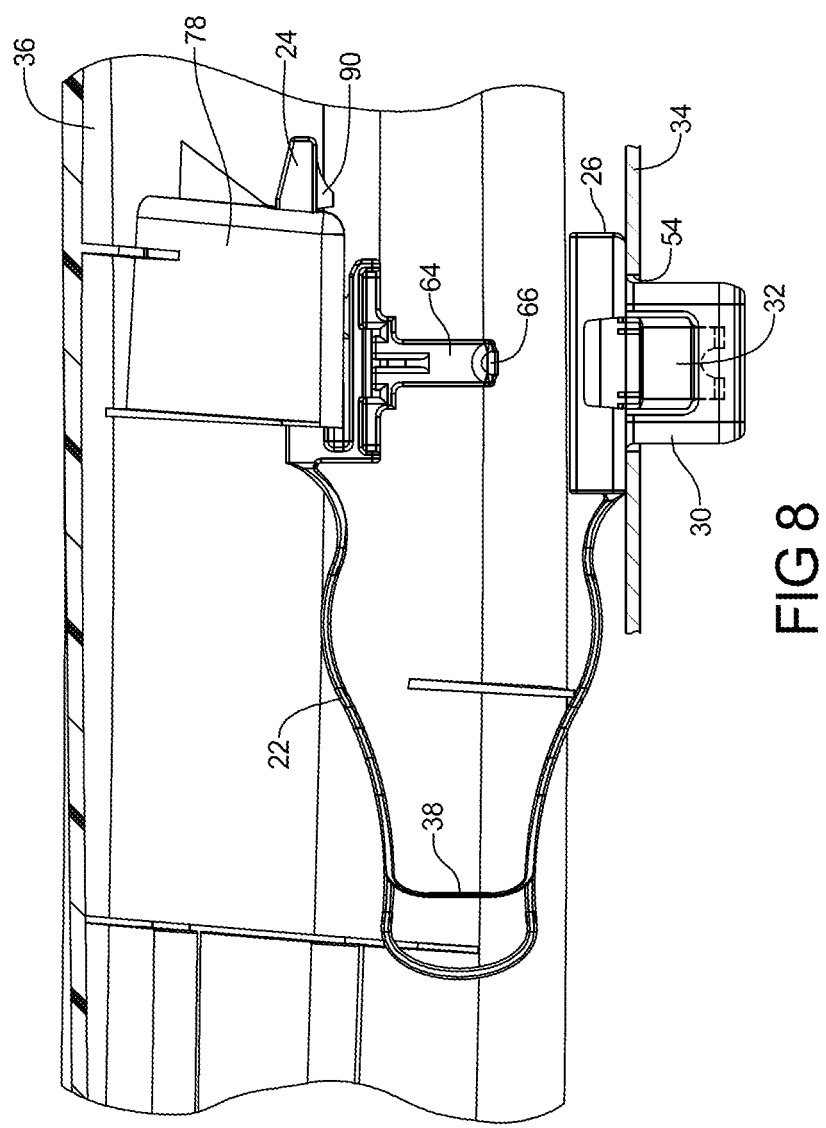
FIG. 8 is a side elevation view of the tethered fastener of FIG. 1 moving toward a longitudinally extended state during an airbag deployment.

During an airbag deployment, the airbag generates a separation force that exceeds the retention capacity of the cooperating longitudinally extending rail members 70 and 72. Thus, the first connector end 24 uncouples and moves away from the second connector end 26 as shown in FIG. 8. The tether 28 starts to move toward an expanded or longitudinally extended configuration. As shown in FIG. 8, the metal clip 32 remains within the cage 30 coupling the second connector end 26 to the body panel 34 throughout the deployment of the airbag. As also shown in FIG. 8, the frangible straps 38 begin to elongate, absorbing energy until they ultimately separate into two pieces. As a result, the amount of force that must be transferred through the non-releasable couplings between the first connector end 24 and the trim panel 36 and between the second connector end 26 and the body panel 34 as the tether reaches its expanded or longitudinally extended state is reduced.

Various of the above-described features can be advantageously combined together. For example, a tethered fastener 20 can include a plastic body defining or including a first connector end 24, a second connector end 26, and an elongate tether 28 coupled between the first and second connector ends 24 and 26. The second connector end 26 can retain a metal clip 32 including two outwardly extending wing members 46 joined together at a U-shaped base 50. A frangible strap 38 can extend from a first point 40 along a longitudinal length of the plastic tether 28 to a second point 42 along the longitudinal length of the plastic tether 28. The frangible strap 38 has a strap length that is less than the distance between the first and second points 40 and 42 along the longitudinal length of the plastic tether 28. The frangible strap 38 elongates and/or separates as a result of a tensile force acting on the frangible strap 38 as the tether 28 moves from a folded configuration to a longitudinally extended configuration.

A tethered fastener 20 can include a plastic body defining or including a first connector end 24, a second connector end 26, and an elongate tether 28 coupled between the first and second connector ends 24 and 26. The second connector end 26 can retain a metal clip 32 including two outwardly extending wing members 46 joined together at a U-shaped base 50. A longitudinal coupling rail member 70 can extend adjacent each lateral side of the first connector end 24. A cooperating longitudinal coupling rail member 72 can extend adjacent each lateral side of the second plastic connector 26. The longitudinal coupling rail members 70 cooperate with the cooperating longitudinal coupling rail members 72 to couple the first connector end 24 to the second connector end 26 in a folded, shipping, or normal configuration and to allow the first connector end 24 to separate from the second connector end 26 during an airbag deployment.

A tethered fastener 20 can include a plastic body defining or including a first connector end 24, a second connector end 26, and an elongate tether 28 coupled between the first and second connector ends 24 and 26. The second connector end 26 can include a cage housing 30 by which a metal clip 32 is non-releasably coupled to the second connector 26. The metal clip 32 remains in the cage housing 30 during an airbag deployment. The metal clip 32 can include two outwardly extending wing members 46 joined together at a U-shaped base 50 to retain the cage housing 30 within an aperture 54 of a second automotive component 34 during an airbag deployment.

Related manufacturing methods can include providing a tethered fastener 20 having any combination of features and/or configuring the tethered fastener 20 to have any of the characteristics or functionality described herein. Such methods can include releasably coupling the metal clip 32 to a protruding member 64 and inserting the metal clip 32 into the cage housing 30 through an insertion opening 62. Inserting the metal clip 32 through an insertion opening 62 can compress the wings 46 toward each other causing opposing wing portions, which can be opposing transversely extending walls 52, of each wing 46 to pass alongside each other.

As used herein, "releasably" coupled means that the coupling releases or disengages during an airbag deployment. "Non-releasably" coupled means that the coupling does not release or disengage throughout an airbag deployment.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motor vehicle airbag occupant restraint system tethered fastener comprising:
    a first plastic connector end coupled to a second plastic connector end via an elongate plastic tether having a longitudinal length extending completely from and between the first and second connector ends;
    a frangible strap extending from a first point along the longitudinal length of the plastic tether to a second point along the longitudinal length of the plastic tether;
    a metal clip non-releasably coupled to the second connector end;
    wherein the first and second connector ends are releasably adjacently coupled together with the frangible strap in a non-extended configuration when the first connector end is non-releasably coupled to a first of an associated automobile portion and an associated trim component and the second connector end is non-releasably coupled to a second of the associated automobile portion and associated trim component via the metal clip; and
    wherein the frangible strap has a longitudinal strap length that is less than a distance between the first and second points along the longitudinal length of the plastic tether, and wherein the frangible strap deforms, separates, or both, as a result of a tensile force acting on the frangible strap as the plastic tether moves from the non-extended configuration to an extended configuration when an associated airbag deploys separating the associated automobile portion and trim component and the first and second connector ends, and wherein the frangible strap comprises a pair of frangible straps extending from opposing lateral sides of the plastic tether.

2. The occupant restraint system tethered fastener of claim 1, wherein the frangible strap comprises a plurality of frangible straps.

3. The occupant restraint system tethered fastener of claim 2, wherein the longitudinal strap length of each of the plurality frangible strap are equal length.

4. The occupant restraint system tethered fastener of claim 1, wherein the frangible strap comprises a U-shaped configuration when the plastic tether is in the non-extended configuration.

5. The occupant restraint system tethered fastener of claim 1, wherein deformation, separation, or both, of the frangible strap continues, allowing the frangible strap to absorb energy until the frangible strap experiences a force of at least 500 Newtons.

6. The occupant restraint system tethered fastener of claim 1, wherein the second connector end to which the metal clip is non-releasably coupled defines a cage housing receiving and retaining at least a portion of the metal clip within the cage housing, and wherein the metal clip is non-releasably retained within the cage housing when an associated airbag deploys separating the associated automobile portion and trim component and the first and second connector ends.

7. The occupant restraint system tethered fastener of claim 6, wherein the first and second connector ends are releasably adjacently coupled together via a pair of parallel coupling elongate rail members of the first connector end engaging a cooperating pair of parallel coupling elongate rail members of the second connector end.

8. The occupant restraint system tethered fastener of claim 1, wherein the first and second connector ends are releasably adjacently coupled together via a pair of parallel coupling elongate rail members of the first connector end engaging a cooperating pair of parallel coupling elongate rail members of the second connector end.

9. The occupant restraint system tethered fastener of claim 8, wherein the pairs of rail members extend along opposing sides of the respective connector ends.

10. The occupant restraint system tethered fastener of claim 8, wherein the pairs of rail members extend along opposing longitudinal sides of the respective connector ends.

11. A motor vehicle airbag occupant restraint system tethered fastener comprising:
   a metal clip;
   a first plastic connector end having a releasable coupling member a second plastic connector end having a cooperating releasable coupling member and having a cage housing retaining the metal clip;
   an elongate plastic tether extending completely from and between the first and second connector ends to couple the first and second connector ends together;
   wherein the first and second connector ends are releasably coupled together via the releasable coupling members when the first connector ends is non-releasably coupled to a first of an associated automobile portion and an associated trim component, and when the metal clip is non-releasably retained within the cage housing and the second connector end is non-releasably coupled to a second of the associated automobile portion and the associated trim component via the metal clip, and wherein the metal clip non-releasably remains within the cage housing and non-releasably coupled to the second of the associated automobile portion and the associated trim component during deployment of the occupant restraint system when an associated airbag deploys uncoupling the releasable coupling members and separating the associated automobile portion and trim component and the first and second connector ends, and wherein the metal clip comprises a U-shaped end supporting at least one retention wing member, and the cage housing comprises a recess that receives at least a portion of the metal clip.

12. The occupant restraint system tethered fastener of claim 11, wherein the first plastic connector end has a protruding arm that engages the metal clip adjacent an inside of the U-shaped end of the metal clip, wherein the protruding arm extends to facilitate inserting the metal clip into the cage housing.

13. The occupant restraint system tethered fastener of claim 12, wherein the protruding arm includes a retention member for releasably engaging a cooperating retention member of the metal clip at least during insertion of the metal clip into the cage housing.

14. The occupant restraint system tethered fastener of claim 11, wherein the metal clip comprises a U-shaped end supporting two extending retention wing members, each side end of each of the retention wing members having an inwardly extending wall including an upwardly and inwardly angled surface, the inwardly extending walls being longitudinally offset from each other, wherein the inwardly extending walls can pass along each other as to not limit compression of the metal clip due to interference between the inwardly extending walls of the two retention wing members.

15. The occupant restraint system tethered fastener of claim 14, wherein the cage housing comprises a metal clip insertion opening that has a transverse dimension requiring the transversely extending walls of the clip to pass along each other during insertion of the clip through the metal clip insertion opening.

16. The occupant restraint system tethered fastener of claim 11, wherein the cooperating releasable coupling members comprise a pair of parallel coupling elongate rail members of the first connector end engaging a cooperating pair of parallel coupling elongate rail members of the second connector end.

17. The occupant restraint system tethered fastener of claim 16, wherein the pairs of rail members extend along opposing longitudinal sides of the respective connector ends.

18. The occupant restraint system tethered fastener of claim 16, wherein at least one of the pairs of rail members is defined by a plurality of segments.

19. The occupant restraint system tethered fastener of claim 11, wherein deformation, separation, or both, of a frangible strap continues, allowing the frangible strap to absorb energy until the frangible strap experiences a force of at least 500 Newtons.

20. A motor vehicle airbag occupant restraint system tethered fastener comprising:
   a first plastic connector end coupled to a second plastic connector end via an elongate plastic tether having a longitudinal length extending completely from and between the first and second connector ends;
   a frangible strap extending from a first point along the longitudinal length of the plastic tether to a second point along the longitudinal length of the plastic tether;
   a metal clip non-releasably coupled to the second connector end;
   wherein the first and second connector ends are releasably adjacently coupled together with the frangible strap in a non-extended configuration when the first connector end is non-releasably coupled to a first of an associated automobile portion and an associated trim component and the second connector end is non-releasably coupled to a second of the associated automobile portion and associated trim component via the metal clip; and
   wherein the frangible strap has a longitudinal strap length that is less than a distance between the first and second points along the longitudinal length of the plastic tether, and wherein the frangible strap deforms, separates, or both, as a result of a tensile force acting on the frangible strap as the plastic tether moves from the non-extended configuration to an extended configuration when an associated airbag deploys separating the associated automobile portion and trim component and the first and second connector ends, and wherein the first and second connector ends are releasably adjacently coupled together via a pair of parallel coupling elongate rail members of the first connector end engaging a cooperating pair of parallel coupling elongate rail members of the second connector end.

21. The occupant restraint system tethered fastener of claim 20, wherein the pairs of rail members extend along opposing sides of the respective connector ends.

22. The occupant restraint system tethered fastener of claim 20, wherein the pairs of rail members extend along opposing longitudinal sides of the respective connector ends.

23. The occupant restraint system tethered fastener of claim 20, wherein the deformation, separation, or both, of the frangible strap continues, allowing the frangible strap to absorb energy until the frangible strap experiences a force of at least 500 Newtons.

* * * * *